United States Patent [19]

Giannis et al.

[11] Patent Number: 4,466,583
[45] Date of Patent: Aug. 21, 1984

[54] CASSETTE DOOR LATCH

[75] Inventors: Peter M. Giannis, Arlington Heights; Don R. Coy, Jr., Palatine, both of Ill.

[73] Assignee: T/B & H Home Video, Northbrook, Ill.

[21] Appl. No.: 407,502

[22] Filed: Aug. 12, 1982

[51] Int. Cl.³ .......................... G03B 1/04; G11B 15/32
[52] U.S. Cl. ...................................... 242/198; 206/406
[58] Field of Search ................................ 242/197–200; 360/96.1, 132; 206/404–406; 292/69, 80, 129, 163, 180, 219, 229; 220/323, 334

[56] References Cited

U.S. PATENT DOCUMENTS

| 3,661,250 | 5/1972 | Lyman | 206/405 |
| 4,212,437 | 7/1980 | Shiba et al. | 242/199 |
| 4,323,207 | 4/1982 | Gebeke | 242/198 |

FOREIGN PATENT DOCUMENTS 1149668 4/1969 United Kingdom .
1272684 5/1972 United Kingdom .
1411967 10/1975 United Kingdom .

Primary Examiner—Leonard D. Christian
Attorney, Agent, or Firm—Lockwood, Dewey, Alex & Cummings

[57] ABSTRACT

A latch for the door of a tape cassette includes a latching member for latching the door closed. The latching member is mounted for rotation about an axis between latching and unlatching positions. A spring, including a resilient arm, urges the latching member toward the latching position. One end of the arm is formed in integral, one-piece relationship to the latching member and the opposite end of the arm is free, but bears against a wall in one of the cassette housing halves on the side of the latching member in the direction of rotation toward the unlatching direction. In one embodiment of latch, the end of the arm which is attached to the latching member is located between the axis of rotation and the opposite free end of the arm. In a second embodiment of latch, the end of the arm which is attached to the latching member is spaced from the axis of rotation and the opposite free end of the arm is between and nearer the axis of rotation than to the attached end and bears slidably against a wall in the cassette. In the latter embodiment, the arm is attached to the latching member by torsion members formed integrally with the latching member and arm to form springs.

25 Claims, 9 Drawing Figures

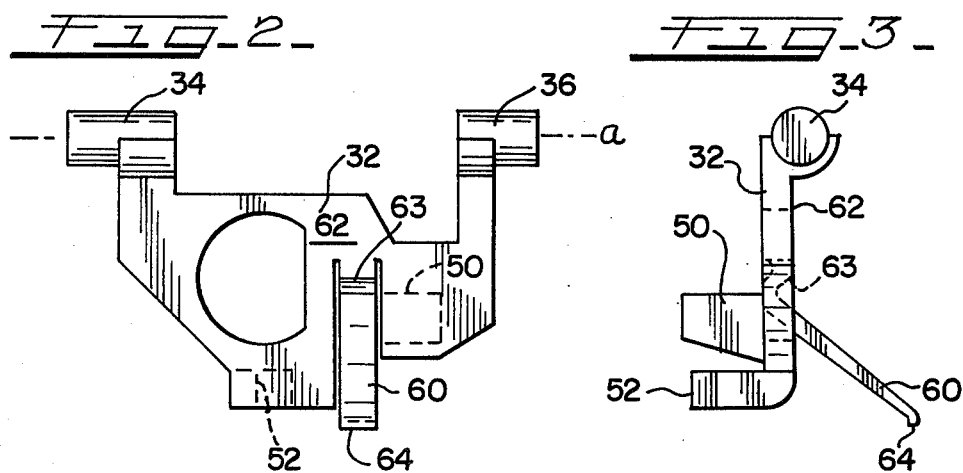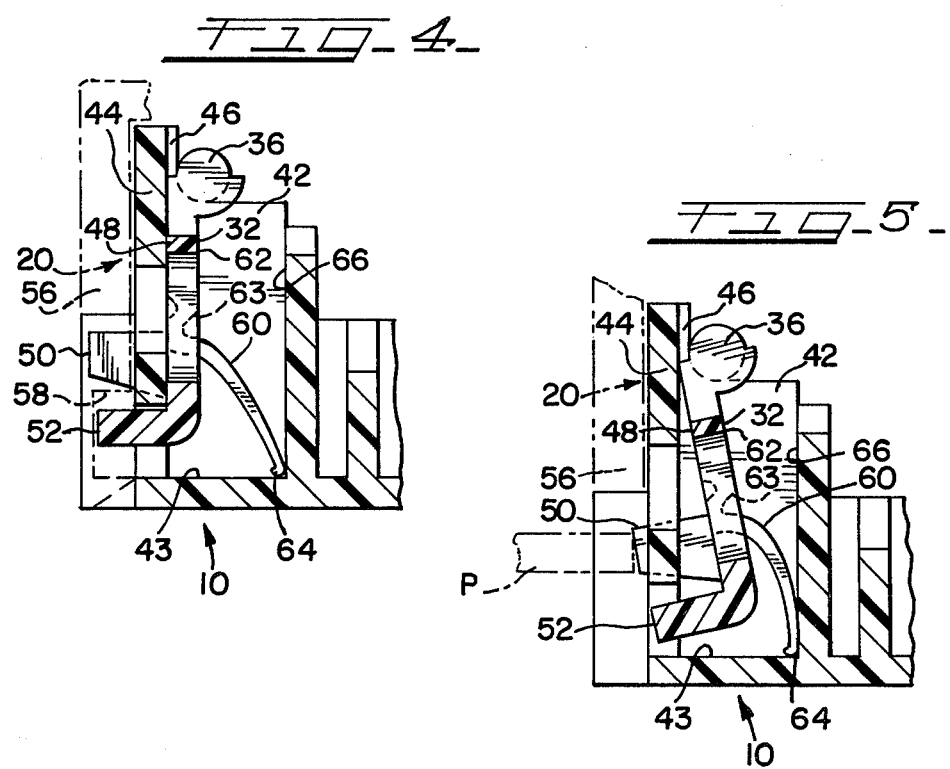

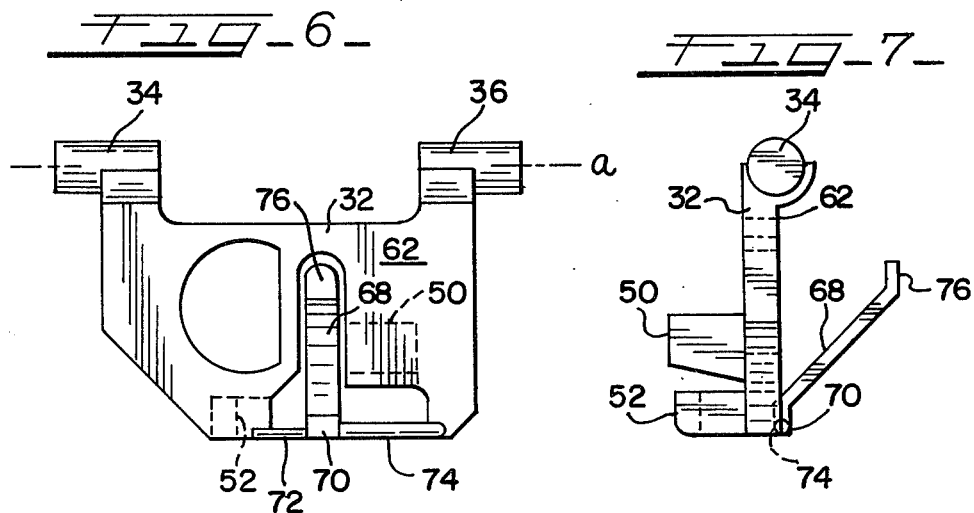

CASSETTE DOOR LATCH

BACKGROUND AND SUMMARY OF THE INVENTION

The present invention relates to a cassette door latch and, more particularly, to an improved door latch for latching a tape cassette access door.

In tape cassettes and, more particularly, video tape cassettes, a door is frequently provided on the cassette for covering the tape which is threaded between the reels of the cassette when the cassette is removed from the recording or playback machine. When the cassette is installed in the recording or playback machine, the door is automatically opened to allow contact of the tape which is then exposed with the recording or playback heads of the machine. When the cassette is removed from the machine, the door is automatically closed and latched in the closed position to protect the tape against damage or contamination.

Prior door latching mechanisms for tape cassettes are disclosed, by way of example, in U.S. Pat. No. 4,212,437. The latches disclosed in that Letters Patent all employ a separately installed spring which urges the latching member of the latch into its latching position relative to the door to latch the door in its closed position. Such separately installed springs have several disadvantages. They require increased inventory of parts and the manipulation and installation of both the separate latching member itself and the spring in separate steps. In certain of these prior latches, the spring is extremely tiny. Thus, the spring is difficult to manipulate by hand, and is virtually impossible to install by automated procedures. Moreover, the presence of the multiple, separate pieces results in increased material and installation costs and increases the possibility that the separate pieces may become separated after installation, either in transportation, in use or if the cassette housing is taken apart for any reason after it has been assembled.

In U.S. Pat. No. 4,323,207 a latch and spring is disclosed which overcomes some of the aforementioned disadvantages of the mechanisms which employ separate latching members and springs. That Letters Patent discloses a slidable latch mechanism for latching the door of a tape cassette in the closed position which includes a spring molded integrally with the latch to urge the latch toward its latching position. The integral latching mechanism as disclosed in that Letters Patent has the disadvantage, however, of requiring a substantial force on the mechanism to move it toward its unlatched position. Another disadvantage of this latching mechanism is that it is subject to excessive "creep" which is a condition inherent in plastics which causes them to set in a certain shape after a period of time, particularly when exposed to higher temperatures such as might be encountered in the recording or playback machine. Such "creep" results in the spring taking a set when confined in its unlatched position, thereby reducing the ability of the spring to return the latch to its latched condition. Still another disadvantage of the latching mechanism disclosed in this Letters Patent is that the latching member and its spring are of considerable size and occupy a substantial portion of the already restricted and compact area which is available in the cassette housing.

A latch incorporating the principles of the present invention overcomes these several aforementioned disadvantages. A latch incorporating the principles of the present invention eliminates the need for separate latching members and springs and, thus, reduces the number of parts. Such reduction in the number of parts in the present invention reduces both the material and installation costs, reduces the amount of parts needed to be kept in inventory, and not only facilitates hand assembly of these mechanisms, but also facilitates assembly of these mechanisms by automated procedures. A latch incorporating the principles of the present invention also reduces the likelihood of separation of parts, either in use, in transportation or upon disassembly of the cassette housing. A latch incorporating the principles of the present invention may be readily installed without the need for major redesign of previously configured housings to render the housings compatible to the latch of the invention. A latch incorporating the principles of the present invention is readily operable with a minimum of force and under the environmental conditions normally encountered by tape cassettes and requires only a minimum of space in the cassette housing.

In one principal aspect of the present invention, a latch for the door of a tape cassette comprises a substantially rigid latching member for latching the door closed, mounting means for mounting the latching member for rotation about an axis between latching and unlatching positions, and spring means for urging the latching member toward the latching position. The spring means includes a resilient arm having one end formed in integral, one-piece relationship to the latching member and the arm projects from the latching member in the direction of rotation of the latching member toward the unlatching position.

In another principal aspect of the present invention, the one end of the arm which is attached to the latching member is located between the axis of rotation and the free opposite end of the arm.

In still another principal aspect of the present invention, the one end of the arm which is attached to the latching member is spaced from the axis of rotation and the other free end of the arm is nearer the axis of rotation than to the one end of the arm.

In still another principal aspect of the present invention, in the last mentioned configuration elongate torsion means extends substantially perpendicular to the resilient arm, the torsion means is formed in integral, one-piece relationship to the arm and the latching member and mounts the arm to the latching member for rotation of the arm relative to the latching member about an axis substantially perpendicular to the arm.

These and other objects, features and advantages of the present invention will be clearly understood through a consideration of the following detailed description.

BRIEF DESCRIPTION OF THE DRAWINGS

In the course of this description, reference will frequently be made to the attached drawings in which:

FIG. 2 is a front elevation view of the latch as viewed from the left in FIG. 1;

FIG. 3 is an end elevation view of the latch as viewed from the left in FIG. 2;

FIG. 4 is a broken, cross-sectioned end elevation view of the latch as installed in the cassette and as viewed substantially along line 4—4 of FIG. 1, and showing the latch in its latching position;

FIG. 5 is a broken, cross-sectioned end elevation view of the latch as shown in FIG. 4, but in its unlatched position;

FIG. 6 is a front elevation view of a second preferred embodiment of latch constructed in accordance with the principles of the invention;

FIG. 7 is an end elevation view of the second embodiment of latch as viewed from the left in FIG. 6;

FIG. 8 is a broken, cross-sectioned end elevation view of the second embodiment of latch as installed in the cassette and showing the latch in its latching position; and FIG. 9 is a broken, cross-sectioned end elevation view of the latch as shown in FIG. 8, but in its unlatched position.

DESCRIPTION OF THE PREFERRED EMBODIMENTS

Figure 1:
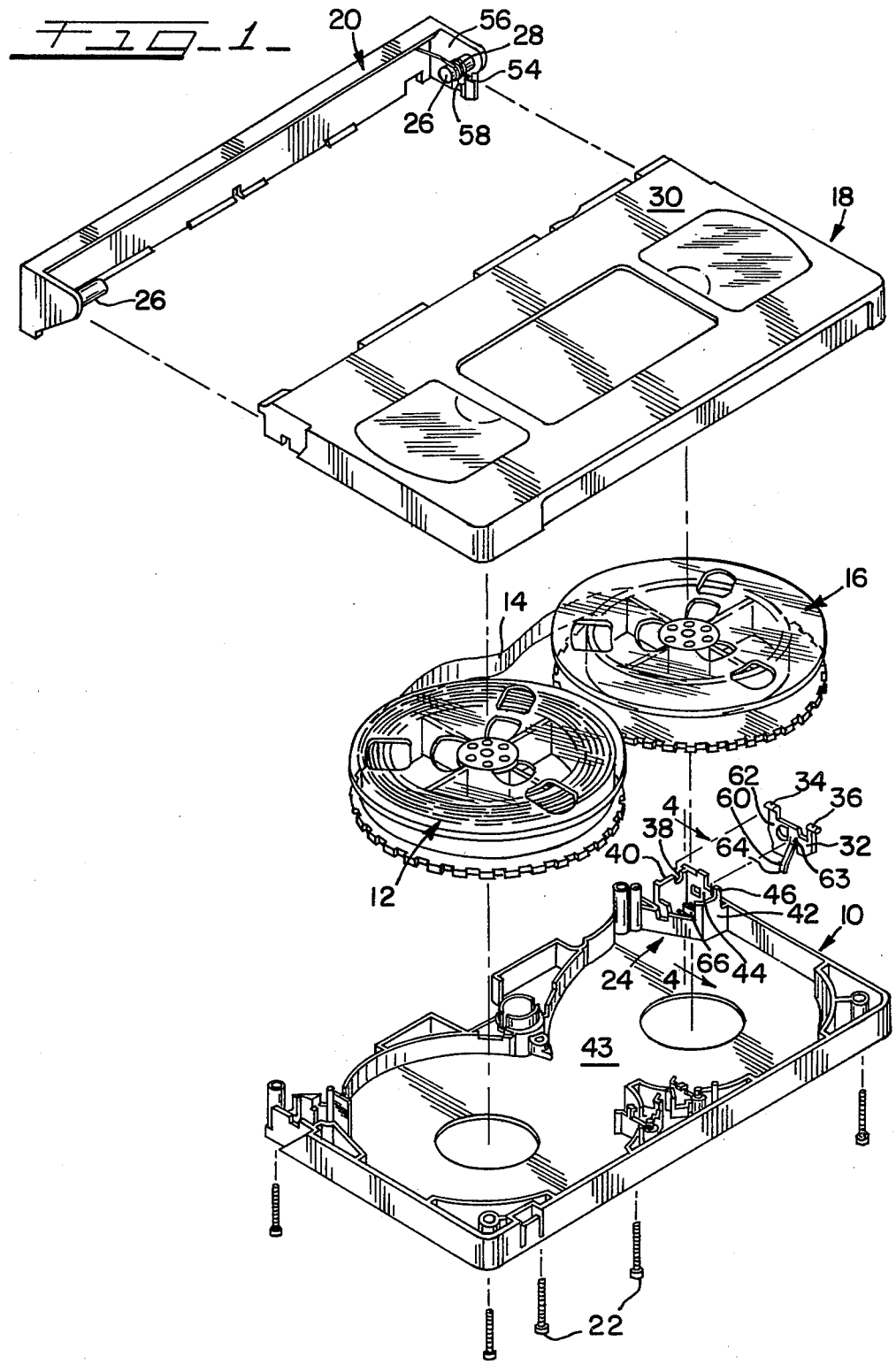
FIG. 1 is an overall perspective, exploded view of a video tape cassette showing one preferred embodiment of latch constructed in accordance with the principles of the present invention.

One preferred embodiment of the present invention is shown in FIGS. 1–5. A video tape cassette is shown in FIG. 1 which generally includes a housing bottom half 10, a left reel 12 having a video tape 14 stored thereon in readiness for play, a right pickup reel 16, a housing top half 18 having a door 20 for covering and protecting the exposed tape, and a plurality of screws 22 for attaching the bottom and top halves of the housing together. The interior of the housing includes a number of features which are common generally to video tape cassettes and which will not be described herein in detail because they do not constitute important features of the present invention. The present invention resides in the latch which is generally indicated in the area denoted by 24 in FIG. 1.

As shown in FIG. 1, the door 20 includes a pair of opposed pins 26 on the ends of the door for mounting the door for rotation on the housing top half 18 between an open position and a closed position covering the otherwise exposed tape. The pin 26 adjacent the latch area 24 includes a torsion spring 28 which fits on the pin and extends into underlying relationship with the top cover 30 of the housing top half 18 to urge the door into a normally closed relationship to the cassette. The torsion spring arrangement as just described is generally conventional in the art and will not be described in further detail. The latch of the present invention automatically locks the door 20 in its closed position covering the tape which is exposed between the reels when the cassette is out of the recording or playback machine to prevent accidental unwinding, damage or contamination of the tape. However, the latch automatically unlocks the door when the cassette is placed in the machine and allows the door to be opened to expose the tape to the recording or playback heads of the machine against the force of spring 28.

One preferred embodiment of the latch of the present invention comprises a generally planar, substantially rigid latching member 32 which is mounted for rotational movement about a substantially horizontal axis a, as shown in FIG. 2, between a latching position in which the latching member 32 latches the door 20 in its closed position, as shown in FIG. 4, and an unlatching position in which the door is unlatched for opening, as shown in FIG. 5. Such rotational movement is provided by a pair of outwardly extending journals 34 and 36.

Journal 34 rests in a notch 38 in the forward wall 40 of the housing bottom half 10, as shown in FIG. 1. The other journal 36 rests on the top of an interior wall 42 which extends upwardly from the bottom wall 43 of the housing bottom half 10. The journals 34 and 36 are spaced slightly from the sidewall 44 of the bottom half 10 of the cassette by the notch 38 being spaced slightly from that wall and by a narrow elevated tab 46 on the top of the interior wall 42, respectively. The spacing of the journals 34 and 36, however, is such that, when the latching member 32 is in its latched position, the outer surface 48 of the latching member is positioned against the inner surface of the cassette sidewall 44 as shown in FIG. 4.

A pair of projections 50 and 52 extend from the outer surface 48 of the latching member 32 as shown in FIGS. 2–5. Projection 50 extends outwardly from the outer surface 48 of the latching member, through a slotted opening (not clearly shown) in the housing sidewall 44, and into a slotted opening 54 in the sidewall 56 of the door 20 as shown in FIG. 1. The outer end of projection 50 is accessible through opening 54 from the exterior of the cassette for a reason to be described shortly. The projection 52 also extends outwardly from the bottom of the outer surface 48 of the latching member and into a recess 58 on the interior of the door sidewall 56 to latch the door in the closed position, as shown in FIG. 4.

An elongate resilient arm 60 is formed on the latching member 32 to extend from the opposite inner surface 62 of the latching member toward the interior of the bottom housing half 10 and in the direction of rotation of the latching member toward its unlatched position. Arm 60 is attached at one end 63 to the latching member 32 in integral, one-piece relationship to the latching member, such as by injection molding the latching member and arm together. The opposite other end 64 of arm 60 extends freely from the latching member 32 as shown in FIG. 3.

Arm 60 is of a length such that when the latching member 32 is in its latching position, as shown in FIG. 4, the end 64 of the arm just contacts an upstanding inner wall 66 in the housing bottom half 10 as shown in FIG. 4. Such contact maintains a slight urging force on the latching member to urge it toward its latching position, as shown in FIG. 4, latching the door 20 in its closed position. However, when the cassette is placed in the recording or playback machine, an actuating pin P, as shown in FIG. 5, engages projection 50 which is exposed to the cassette exterior via the slotted opening 54 in the door, and pushes the projection 50 inwardly of the cassette housing to disengage the latching projection 52 from the recess 58 in the sidewall 56 of the door 20. As the projection 50 is pushed inwardly, the door 20 is unlatched and is opened by other mechanisms (not shown) in the recording and playback machine. As the latching member 32 is moved to its unlatching position, as shown in FIG. 5, the resilient arm 60 is progressively brought to bear against the wall 66 to cause a continuously increasing bowing and tension in the arm so that the arm acts as a spring which urges the latching member back toward its latching position, as shown in FIG. 4. When the cassette is removed from the recording and playback machine, the pin P no longer biases the projection 50 inwardly, and the stored spring tension in arm 60 returns the latching member 32 to its latching position while, at the same time, the torsion spring 28 is returning the door to its closed position.

It will be seen that the latch which has just been described not only eliminates the need for separate springs and latching members as exist in the prior art, but also avoids the attendant disadvantages of such separate elements. Moreover, the total length of the resilient arm 60 is short, i.e. shorter than the height of the latching member 32. Thus, only a minimum of space is occupied by the latch of the invention. The arm 60 is capable of being dimensioned to require only a minimum of force which must be exerted by the actuating pin P to unlatch the latching member 32, yet the spring action of the arm is ample to return the latching member to its latched position.

The second preferred embodiment of latch shown in FIGS. 6-9 is similar in a number of respects to the first preferred embodiment of latch which has just been described. Accordingly, like reference numerals will be employed to designate like components. The principal difference between this second embodiment and the previously described embodiment resides in the resilient spring arm and the manner in which it is mounted to the latching member 32.

In the second embodiment of latch shown in FIGS. 6-9, a resilient arm 68 also extends from the latching member 32 in the direction of its rotation about axis a toward the unlatching position, but in an upward direction. Arm 68 is attached at one end 70 to the latching member 32 by way of a pair of torsion members 72 and 74 as shown in FIG. 6. The end 70 of the resilient arm 68, the torsion members 72 and 74, and the latching member 32 are all preferably formed in integral, one-piece relationship with each other, such as by injection molding. The torsion members 72 and 74 extend substantially perpendicularly to the resilient arm 68, as shown in FIG. 6, and are preferably substantially circular in cross-section. The torsion members 72 and 74 act as torsion springs about which the resilient arm 68 rotates when the latch is moved to the unlatching position as shown in FIG. 9. Torsion member 74 is shown to be somewhat larger in diameter than the diameter of torsion member 72 only to insure that the rotative torsion forces exerted by the torsion members 72 and 74 are equal and exert like torque forces on both sides of the resilient arm 68 to prevent the arm from cocking or skewing during operation. Torsion member 74 is shown as being larger in diameter because it is longer and spans a greater distance than torsion member 72.

The other opposite end 76 of resilient arm 68, likewise, is free but bears against the upstanding inner wall 66 in the housing bottom half 10 as shown in FIG. 8, when the latching member 32 is in its latching position. The force exerted on the latching member 32 in this condition is preferably sufficient to maintain it in its latched position. As the latching member 32 is rotated towards its unlatching position by the actuating pin P, as shown in FIG. 9, the resilient arm 68 rotates about the axis of the torsion members 72 and 74 which extends generally perpendicular to the arm 68 to cause an increasing twisting or torque force in these torsion members. As the latching member 32 rotates toward its unlatching position, as shown in FIG. 9, the free end 76 of resilient arm 68 slidably rides upwardly on the inner surface of the wall 66. When the cassette is removed from the recording and playback machine, the actuating pin P no longer urges the projection 50 inward of the cassette, and the stored torque force in the torsion members 72 and 74 causes the latching member to rotate back to its latching position, as shown in FIG. 8.

The last described embodiment of the present invention enjoys all the advantages of the first described embodiment. In addition, the last described embodiment enjoys several further advantages.

It will be noted that the end 70 of the arm 68 is attached, via the torsion members 72 and 74, to the latching member 32 in spaced elevational relationship to the axis of rotation a and the arm 68 extends upwardly such that its end 76 is positioned nearer the axis a in elevation than to its end 70. This is contrary to the positioning of these elements in the first embodiment in which the attached end 63 of arm 60 is positioned between the axis of rotation a and the outer end 64 of the arm 60. By positioning the end 76 of arm 68 in the embodiment shown in FIGS. 6-9 nearer the axis of rotation a, the moment arm for resisting movement of the latching member 32 to its unlatched position is minimized with a minimum of rotation of the arm 68 relative to the latching member 32. This condition minimizes the actuating force which need be exerted by the pin P and also minimizes the effect of "creep" which is inherent in most, if not all, plastics. "Creep" is a condition in which various plastics tend to take a set in the shape in which they are tensioned over a period of time and, particularly, when they are exposed to elevated temperatures during that time. Such "creep" or "set", if it occurred in arm 68 where, for example, the cassette has been stored in the recording or playback machine for a substantial period of time, might diminish the spring return force of arm 68 to the point that the arm would no longer be able to exert sufficient force on the latching member 32 to fully return it to its latching position. The likelihood of such "creep" occurring is also minimized, if not eliminated altogether, by the provision of the torsion members 72 and 74 which act to spread the spring return tension over a substantial length and store it in the form of torque force to minimize the "creep" effect. Bowing of the resilient arm 68, which might also otherwise tend to result in "creep", is also minimized by the ability of the end 76 of the resilient arm 68 to slide upwardly against the wall 66 during rotation of the latching member to its unlatched position, rather than be trapped at the intersection of the bottom of the wall 66 with the bottom 43 of the housing bottom half 10, as is the arm 60 in the first described embodiment. This ability of arm 68 to slide reduces the degree of bowing of the arm and, thus, reduces the tendency of "creep" to occur.

Although the latch of the preferred embodiments of the present invention may be formed of any one of a wide range of materials, including metals, thermoplastic polymers are preferred and, of such polymers, acetal resins, such as Delrin, are particularly preferred. It has been found that these polymers are of sufficient strength, yet exhibit excellent resiliency to allow operation of the latch with minimum forces and at the temperatures typically encountered by the cassettes in environments both in and out of the recording or playback machines.

It will be understood that although the present invention has been described in terms of a video tape cassette, the principles of the present invention are equally applicable to other forms of cassettes, such as audio tape cassettes, which may employ a door to protectively cover the tape.

It will also be understood that the embodiments of the present invention which have been described are merely illustrative of a few of the applications of the principles of the present invention. Numerous modifications may be made by those skilled in the art without departing from the true spirit and scope of the invention.

What is claimed is:

1. A latch for the door of a tape cassette comprising:
   a substantially rigid latching member for latching the door closed and having a latching projection thereon to latch the door;
   mounting means for mounting said latching member for rotation about an axis between latching and unlatching positions;
   means for biasing said latching member toward said unlatching position, said biasing means being spaced from said axis toward said latching projection;
   spring means for urging said latching member toward said latching position, said spring means including a resilient arm having one end formed in integral, one-piece relationship to said latching member, said arm projecting from said latching member in the direction of said rotation toward said unlatching position.

2. The latch of claim 1, wherein the end of said arm opposite said one end is free.

3. The latch of claim 1, wherein said means for biasing said latching member includes a second projection extending outwardly from said latching member in the direction of said rotation toward said latching position.

4. The latch of claim 3, wherein said latching projection is positioned to cooperate with the door to latch the door when the latching member is in said latching position.

5. The latch of claim 1, wherein said latching member and said resilient arm are formed of a thermoplastic polymer.

6. The latch of claim 5, wherein said polymer is an acetal resin.

7. The latch of claim 1, wherein said one end of said resilient arm is located between the axis of rotation of said mounting means and the end of said arm opposite said one end.

8. The latch of claim 1, wherein said one end of said resilient arm is spaced toward said projection from the axis of rotation of said mounting means, and the end of said arm opposite said one end is between said axis of rotation and said one end of said arm.

9. The latch of claim 1, including elongate torsion means extending substantially perpendicular to said resilient arm, said torsion means being formed in integral, one-piece relationship to said arm and said latching member and mounting said arm to said latching member for rotation of the arm relative to said latching member about an axis substantially perpendicular to said arm.

10. A latch for the door of a tape cassette comprising:
    a substantially rigid latching member for latching the door closed and having a latching projection thereon;
    mounting means for mounting said latching member for rotation about an axis between latching and unlatching positions; and
    spring means for urging said latching member toward said latching position, said spring means including a resilient arm having one end formed in integral, one-piece relationship to said latching member, said arm projecting from said latching member in the direction of said rotation toward said unlatching position, said one end of said resilient arm being spaced toward said projection from the axis of rotation of said mounting means, and the end of said arm opposite said one end is between said axis of rotation and said one end of said arm.

11. The latch of claim 10, wherein said other end of said resilient arm is nearer the axis of rotation than to said one end of said arm.

12. A latch for the door of a tape cassette comprising:
    a substantially rigid latching member for latching the door closed;
    mounting means for mounting said latching member for rotation about an axis between latching and unlatching positions;
    spring means for urging said latching member toward said latching position, said spring means including a resilient arm having one end formed in integral, one-piece relationship to said latching member, said arm projecting from said latching member in the direction of said rotation toward said unlatching position; and
    elongate torsion means extending substantially perpendicular to said resilient arm, said torsion means being formed in integral, one-piece relationship to said arm and said latching member and mounting said arm to said latching member for rotation of the arm relative to said latching member about an axis substantially perpendicular to said arm.

13. The latch of claim 12, wherein said torsion means is substantially circular in cross-section.

14. The latch of claim 12, wherein said latching member, said resilient arm, and said torsion means are formed of a thermoplastic polymer.

15. The latch of claim 10, including elongate torsion means extending substantially perpendicular to said resilient arm, said torsion means being formed in integral, one-piece relationship to said arm and said latching member and mounting said arm to said latching member for rotation of the arm relative to said latching member about an axis substantially perpendicular to said arm.

16. The latch of claim 15, wherein said torsion means is substantially circular in cross-section.

17. The latch of claim 15, wherein said latching member, said resilient arm, and said torsion means are formed of a thermoplastic polymer.

18. The latch of claim 1, including, in combination therewith, at least one cassette housing half, said latching member being mounted for rotation on said housing half, and a wall in said housing half spaced from said latching member, said resilient arm bearing against said wall adjacent the end of said arm opposite said one end.

19. The latch of claim 18, wherein said arm slidably bears against said wall when said latching member is moved between said latching and unlatching positions.

20. The latch of claim 9, including, in combination therewith, at least one cassette housing half, said latching member being mounted for rotation on said housing half, and a wall in said housing half spaced from said latching member, said resilient arm bearing against said wall adjacent the end of said arm opposite said one end.

21. The latch of claim 10, including, in combination therewith, at least one cassette housing half, said latching member being mounted for rotation on said housing half, and a wall in said housing half spaced from said latching member, said resilient arm bearing against said wall adjacent the end of said arm opposite said one end.

22. The latch of claim 21, wherein said arm slidably bears against said wall when said latching member is moved between said latching and unlatching positions.

23. The latch of claim 12, including, in combination therewith, at least one cassette housing half, said latching member being mounted for rotation on said housing half, and a wall in said housing half spaced from said latching member, said resilient arm bearing against said wall adjacent the end of said arm opposite said one end.

24. The latch of claim 23, wherein said arm slidably bears against said wall when said latching member is moved between said latching and unlatching positions.

25. A latch for the door of a tape cassette comprising:
a substantially rigid latching member for latching the door closed;
mounting means for mounting said latching member for rotation about an axis between latching and unlatching positions;
spring means for urging said latching member toward said latching position, said spring means including a resilient arm having one end formed in integral, one-piece relationship to said latching member, said arm projecting from said latching member in the direction of said rotation toward said unlatching position; and
a pair of projections extending outwardly from said latching member in the direction of said rotation toward said latching position, one of said projections biasing said latching member toward said unlatching position, and the other of said projections is positioned to cooperate with the door to latch the door when the latching member is in said latching position.

* * * * *